| United States Patent [19] | [11] | 4,039,719 |
|---|---|---|
| Matsuda et al. | [45] | Aug. 2, 1977 |

[54] LAMINATED SAFETY GLASS

[75] Inventors: Tadashi Matsuda, Takatsuki; Kunio Yanagisawa, Hirokata, both of Japan

[73] Assignee: PPG Industries, Inc., Pittsburgh, Pa.

[21] Appl. No.: 590,780

[22] Filed: June 26, 1975

Related U.S. Application Data

[63] Continuation of Ser. No. 264,218, June 19, 1972, abandoned, which is a continuation of Ser. No. 786,731, Dec. 24, 1968, abandoned.

[30] Foreign Application Priority Data

Dec. 29, 1967   Japan .................................. 43-85245

[51] Int. Cl.$^2$ ............................................. B32B 27/40
[52] U.S. Cl. ............................ 428/424; 260/75 NH; 428/425
[58] Field of Search ............................... 428/424, 425; 260/75 NK, 75 NB, 75 NH

[56] References Cited

U.S. PATENT DOCUMENTS

| 2,333,639 | 11/1943 | Christ et al. ..................... 260/75 NK |
| 2,729,618 | 1/1956 | Muller et al. .................... 260/75 NK |
| 2,871,218 | 1/1959 | Schollenberger ................... 260/32.8 |
| 3,226,354 | 12/1965 | Heiss .............................. 260/75 NB |
| 3,388,032 | 6/1968 | Saunders ............................. 428/424 |
| 3,620,905 | 11/1971 | Ahramjian ............................ 428/424 |
| 3,791,914 | 2/1974 | Ammons et al. ...................... 428/424 |

*Primary Examiner*—George F. Lesmes
*Assistant Examiner*—R. J. Roche
*Attorney, Agent, or Firm*—Irwin M. Stein; Mark Levin

[57] ABSTRACT

An inexpensive laminated safety glass excelling in resistance to penetration as well as in its low temperature properties, which is hardly discolored with the passage of time, which comprises a laminated assembly of at least two sheets of glass between which is interposed a layer of a polyurethane elastomer, said sheets and said layer being firmly bonded together, said layer of polyurethane elastomer being obtained by curing, in the presence of curing agent, a polyurethane prepolymer having —NCO group at its both ends produced by reacting a diisocyanate with a polyester having —OH group at its both ends which has been obtained by reacting the dicarboxylic acids and their acid anhydrides with at least one kind of glycol, and the process for producing the same.

5 Claims, No Drawings

LAMINATED SAFETY GLASS

This is a continuation of application Ser. No. 264,218, filed June 19, 1972, now abandoned which is a continuation of Ser. No. 786,731, filed Dec. 27, 1968, now abandoned.

This invention relates to a laminated safety glass in which at least two sheets of glass are bonded by a polyurethane resin composition.

A laminated safety glass contemplates by sandwiching a resin composition as an interlayer between two sheets of glass to prevent impacting objects to penetrate the glass as well as to check the scattering of broken pieces of glass when shattered by an impact. For this purpose the resin to be interlaminated as the interlayer is required to have a rubbery elasticity for absorbing the impacting energy, to have great resistance to tearing to ensure that it is not torn away along with the broken pieces of shattered glass, and to have strong adhesiveness to glass for preventing the scattering of the broken pieces of glass. Further, it goes without saying that it must excel in optical transparency.

As a resin possessing all these properties conjointly, the acrylic resin was formerly used, but the acrylic resin had the drawback that its impact strength was inadequate. Its ability to absorb impact energy at optional temperatures below $-10°$ C. was small and hence it was very fragile.

It has become the practice to use the polyvinyl butyral resin obtained by the partial acetalization of polyvinyl alcohol with butyl aldehyde. This polyvinyl butyral resin is very excellent as an interlaminar film in the neighborhood of room temperature. However, since the secondary transition point of this polyvinyl butyral resin to be used as the interlaminar film is in itself high, being $60°-80°$ C., it is used with a plasticizer. Still the temperature at which it can be used is limited $-10°$ to $-20°$ C., and at temperatures below these temperatures it becomes hard and fragile to render its strength at low temperatures inadequate. This polyvinyl butyral resin has the drawbacks that it requires such complicated steps as extruding it into a film of uniform thickness, followed by washing and drying it at the time of its lamination with glass and the operation of lamination under elevated temperature and high pressure. Further, it also has the shortcoming that it tends to become contaminated with foreign matter, such as dust, during these steps. On the other hand, a method in which the complexity of the laminating operation such as above described is solved by using a certain kind of a polyurethane composition and manufacturing a safety glass which can be put to practical use is disclosed in the Japanese Official Patent Gazette, Publication No. 20177/1964.

The foregoing invention relates to a method of producing safety glass which uses polyether type polyurethane composition as the interlayer and is characterized in that the composition consisting of poly(tetramethylene oxide) glycol of an average molecular weight of about 550 – 3000, a diisocyanate and a curing agent is introduced into between the glass sheets and cured. However, even the safety glass produced by this method cannot be regarded as being fully adequate as to its strength properties. Thus, as things stand, the appearance of a safety glass which is still more superior in its properties, and especially resistance to penetration, is being hoped for.

As a result of our assiduous researches with a view to meeting this demand, we were able to invent a laminated safety glass having excellent properties, which could be produced by employment of the casting and curing technique.

It is therefore a primary object of the present invention to provide an inexpensive laminated safety glass having excellent properties, especially excelling in resistance to penetration as well as in its low temperature properties, which is hardly discolored with the passage of time, and a process for readily manufacturing such a glass.

Other objects and advantages of this invention will become apparent from the following description.

The foregoing objects of the present invention are achieved by a laminated assembly comprising at least two sheets of glass between which is interposed a polyurethane elastomer layer which is firmly adhered to the sheets of glass, characterized in that the foregoing of polyurethane elastomer layer is one which has been obtained by curing, in the presence of curing agent, a polyurethane prepolymer having —NCO group at its both ends produced by reacting a diisocyanate with a polyester having —OH at its both ends which has been obtained by reacting at least one compound selected from the group consisting of the dicarboxylic acids and their acid anhydrides with at least one kind of glycol which may also contain one of the other diols.

Further, a safety glass such as described can be manufactured advantageously from the operations standpoint by injecting the foregoing liquid mixture into between at least two sheets of glass, followed by curing the mixture.

The polyesters used in the present invention are also referred to as hydroxyl polyesters and are compounds having the OH group at their ends. These polyesters are produced by the condensation reaction of a dicarboxylic acid, e.g. the aliphatic saturated dicarboxylic acids such as oxalic acid, succinic acid, glutaric acid, adipic acid, pimelic acid, azelaic acid and sebacio acid, the aliphatic unsaturated dicarboxylic acids such as maleic acid, fumaric acid and itaconic acid, the aromatic dicarboxylic acids such as phthalic acid and isophthalic acid, or the anhydrides of these dicarboxylic acid, with a glycol such as ethylene glycol, diethylene glycol, triethylene glycol, propylene glycol and butylene glycol.

The polyesters used in this invention are those prepared by the reaction of a dicarboxylic acid such as hereinabove indicated or an anhydride thereof with a glycol and it is required that they possess the OH group at their both ends. Hence, in their preparation it is necessary to carry out their reaction by adding the glycol in a molar excess. Polyesters of this kind are already available commercially. Further, the molecular weight of the polyester used in this invention is preferably one ranging from 500 to 3000. Polyethylene glycol adipate glycol, which is obtained by the condensation reaction of adipic acid and ethylene glycol, is especially suitable.

Again, according to the present invention, it is also possible to use the co-condensed polyesters obtained by the cocondensation of either one of the aforesaid dicarboxylic acids with two or more of the aforesaid glycols, or two or more of the these dicarboxylic acids with one of these glycols. And suitable in this case are the polyesters obtained by co-condensing adipic acid and ethylene glycol with a still another dicarboxylic acid or another glycol, for example, the co-condensation product of adipic acid, ethylene glycol and 1,4-butane diol, and the co-condensation product of adipic acid, ethylene glycol and propylene glycol. A laminated safety glass excelling in strength and transparency is provided especially when a polyester obtained by co-condensing adipic acid, ethylene glycol and 1,4-butane diol is used.

On the other hand, as the diisocyanate compounds to be used in the present invention mention can be made of such, for example, as tolylene diisocyante, m-phenylene diisocyanate, 1,5-naphthalene diisocyanate, 1,6-hexamethylene diisocyanate, 1,10-decamethylene diisocyanate, xylylene diisocyanate and 1,4-tetramethylene diisocyanate. Particularly convenient for use in this invention is tolylene diisocyanate in view of its appropriate reaction property and ready availability as a low cost commercial product. On the other hand, since discoloration of the laminated safety glass obtained can be prevented by using xylylene diisocyante, its use is especially effective in the case where the requirement calls for a safety glass of high optical transparency and near perfect colorlessness.

According to this invention, a prepolymer having the —NCO group at its both ends which is obtained by reacting the hereinbefore described polyester having the OH group at its both ends with the diisocyanate compound is used. In preparing this prepolymer, the reaction is best carried out in customary manner using the polyester and diisocyanate compound in a mole ratio $$\frac{\text{No. of mols of diisocyanate}}{\text{No. of mols of polyester}} = 1.0 \text{ or more, and}$$

preferably in a range of 1.5 – 2.5. And it is required that this prepolymer has the —NCO group at its both ends and that it is in liquid form.

As the curing agent to be used in the present invention, useable are those which are generally known as being a curing agent or cross-linking agent of the polyurethane resins. The polyamine type curing agents, the polyol type curing agents having two or more hydroxyl groups and the curing systems in which polyamines and and polyols are conjointly used are well-known and can be used in the present invention.

Of the foregoing curing agents, as the polyamine type mention can be made of such as ethylene diamine, hexamethylene diamine, xylene diamine, 4,4'-methylene-bis(2-chloroaniline) (hereinafter referred to as MOCA), diaminodiphenylsulfone and diaminodiphenylmethane. Of these, MOCA is conveniently used in this invention in view of its appropriate pot life. The polyol type curing agents having two or more hydroxyl groups include such as ethylene diol, propylene diol, butylene glycol, pentylene diol, 1,4-butane diol, 2,2-bis(4-hydroxycyclohexane) propane, trimethylol propane, α,α-xylene diol and 1,5-pentane diol. The curing agents in which the polyamines and polyols have been conjointly used are also useful.

In general, the curing speed of the diamine type curing agents is fast and their pot life is rather too short for use in the present invention, but the pot life especially of MOCA is appropriate in this respect and MOCA can be conveniently used without trouble in this respect also.

On the other hand, while the curing speed of the diol type curing agents is slower than that of the diamine type and hence there is no problem in respect of their pot life when used in the present invention, there is the tendency however, when considered from the standpoint of the properties of the product, that the strength of the product is inferior. However, of the diol type curing agents, trimethylolpropane and 1,4-butane diol are without problems from the standpoint of strength of the product and are conveniently useable in this invention. Again, the diamine type and diol type curing agents can be conjointly used. Hence, in this invention, the use as the curing agent of either MOCA, trimethylolpropane or 1,4-butane diol, or the conjoint use of two or more thereof is convenient.

As to the amount of the curing agent to be added to the prepolymer, roughly a mole ratio of prepolymer to curing agent of the order of 4:1 – 5 is used in the present invention, and especially a ratio ca. 4:3 yields a laminated safety glass having superior strength properties. Further, the polyurethane interlaminar film of this invention obtained by the use of the curing agent within the range as above specified in all cases comes within the scope of a thermosetting resin and cannot be formed by the use of such means as extruders.

In the present invention, the reaction product obtained by reacting the aforesaid polyester with the aforesaid diisocyanate compound is usually referred to as a prepolymer. This contains free isocyanate groups in the chain resulting from the reaction of the polyester with an excess of the diisocyanate compound. Hence, it can form a cross-linked structure upon reacting with the active hydrogen contained in such curing agents as polyamines and polyols.

For obtaining a laminated safety glass in accordance with the present invention, a mixture of the prepolymer and the curing agent is introduced into between at least two sheets of glass and cured. Thus, a safety glass having excellent properties can be manufactured with simplicity without the necessity of complicated operations as in the case of the manufacture of safety glass using polyvinyl butyral.

As the procedure for injecting the aforesaid mixture into between the glass sheets, there is one, for example, where the perimeter of the glass sheets is sealed and the mixture is introduced from a hole provided at one side of the seal while venting the air from a hole provided at the other side.

In carrying out the injection of the mixture a viscosity ranging between 500 and 20,000 centipoises is preferred. Further, the injection is preferably carried out at a temperature not exceeding 80° C., since at a temperature above 80° C. the curing of the mixture begins by the action of the curing agent, depending upon kind of curing agent used.

For effecting the cure of the aforesaid mixture, this can be accomplished even at room temperature if allowed to stand for long period of time, say, several days, but preferably the cure is completed in several hours by heating to about 80°–150° C.

Thus, by this procedure of injecting the mixture into between glass sheets, a safety glass having an interlayer of the desired thickness can be manufactured at will by merely adjusting the interval between the glass sheets that are set for the injection of the mixture; and laminated safety glass having an interlayer thickness of the order of 0.2 mm or more, say, 0.2 – 15 mm, and as a practical matter of the order of 0.2 – 5 mm, and at most 1 – 10 mm can be obtained.

Further, to ensure that the product obtained has the properties required of a safety glass, the interlayer must have excellent adhesiveness to glass, weatherability, optical properties and excellent impact resistance.

The polyester type polyurethane, aside from its excellent impact resistance, possesses excellent adhesiveness to glass and weatherability as well. Again, in the case of a front glass of automobiles which is constantly exposed to sunlight, ultraviolet absorbents and antioxidants are effectively used in an interlayer of the safety glass. As ultraviolet absorbents, those commercially available can be used. Included are, for example, the salicylic acid series such as phenyl salicylate, p-tert. butylphenyl salicylate and p-n-octylphenyl salicylate, the benzophenone series such as 2,4-dihydroxybenzophenone, 2-hydroxy-4-methoxybenzophenone, 2-hydroxy-4-octoxybenzophenone and 2,2-dihydroxy-4,4'-dimethoxybenzophenone, and the triazole series such as 4(2'-hydroxy-5'-methylphenyl)benzotriazole and 4(2'-hydroxy-3'-methyl-5'-isobutylphenyl)benzotriazole. Of these, 2,2-dihydroxy-4,4'-dimethoxybenzophenone of the benzophenone series and 4(2'-hydroxy-5'-methylphenyl)benzotriazole of the triazole series are especially effective. As the antioxidants, mention can be made of such as 4,4'-thiobis(6-tert.butyl-3-methylphenol), 3,5-di-tert.butyl-4-hydroxytoluene and dilaurylthiodipropionate. The amount of these ultraviolet absorbents and antioxidants is suitably 0.1 - 5% by weight, based on the prepolymer.

Table I, given below, presents a comparison of the strength of the films obtained by curing some of the polyurethane compositions according to the present invention, with that of the films obtained by curing the polyether type polyurethane that have been known heretofore from Japanese Patent Application Publication No. 20177/1964. A 5% tetrahydrofuran solution of a prepolymer obtained by reaction of a polyester or a polyether with a diisocyanate is mixed with a solution of a curing agent in tetrahydrofuran. The mixture is cast onto a glass sheet. After evaporating the tetrahydrofuran at 50° C., the cast mixture is heated for 3 hours at 130° C. to effect its curing. A transparent, rubbery polyurethane film having a thickness of about 0.5 mm is obtained. The tensile strength, elongation, and tear strength of the film are measured.

product of Hodogaya Chemical Company, Japan) was used.

Note 2.

The tensile strength and elongation were tested with U.T.M. type Instron type tester. On the other hand, the tear resistance was determined in the following manner. A 20 mm cut was made in the middle at the long side of a test specimen 63 × 38 mm. The specimen was then mounted on an Elmendorf tear resistance tester. The numerical values given in the table are relative resistance values; and larger the value, the greater the tear resistance.

As apparent from Table I, the film obtained by curing the polyurethane composition according to the present invention is of itself superior to the heretofore known cured film of the polyether type polyurethane especially in respect of its tear resistance.

For further illustration of the invention laminated safety glass the following examples are given.

EXAMPLE 1

Eighty grams of polyester glycol having a molecular weight of about 2000 (polyethylene glycol adipate) (tradename ODX-280, a product of Japan Reichhold Company) were added dropwise to 17.3 grams of toluene diisocyanate with stirring. After completion of the dropping, the reaction was carried out for 1 hour at 90° C. and for a further 1 hour at 100° C. to synthesize a prepolymer. Next, 10.2 grams of MOCA were dissolved in 20 grams of polyester glycol (ODX-280), and this solution was added to the previously synthesized prepolymer with stirring. The foam formed as the MOCA solution dissolves in the prepolymer was defoamed with vacuum for 30 minutes at 40° C. After completion of the defoaming of the solution, it was injected into between two sheets of glass (commercially available 3-mm soda-lime glass) and pressed for obtaining a uniform thickness of the interlayer. This was followed by the curing reaction which was carried out by heating at 130° C. for 3 hours to obtain a transparent laminated safety glass having a polyurethane interlayer of 0.76 mm thickness.

Table I

| No. | Basic resin Class | Amount (pt by wt) | Diisocyanate Class | Amount (pt by wt) | Curing agent Class | Amount (pt by wt) | Tensile strength kg/mr at 20° C | Elongation % at 20° C | Tear resistance at 20° C |
| --- | --- | --- | --- | --- | --- | --- | --- | --- | --- |
| 1 | polyester | 100 | toluene diisocyanate | 17.3 | MOCA | 13.7 | 2.72 | 655 | 108 |
| 2 | " | " | " | " | " | 10.2 | 4.71 | 591 | 175 |
| 3 | " | " | " | " | " | 6.8 | 2.89 | 546 | 73.5 |
| 4 | " | " | " | " | MOCA 1,4-butane diol | 6.8 1.1 | 3.39 | 720 | 280 |
| 5 | polyether | 100 | toluene diisocyanate | 17.3 | MOCA | 13.7 | 0.50 | 650 | 14.5 |
| 6 | " | " | " | " | " | 10.2 | 3.20 | 690 | 23.2 |
| 7 | " | " | " | " | " | 6.8 | 3.03 | 685 | 16.7 |
| 8 | " | " | " | " | MOCA 1,4-butane diol | 6.8 1.1 | 1.55 | 855 | 37.2 |

Note 1.

As the polyester, polyethylene glycol adipate glycol of a molecular weight of about 2000 (tradename ODX-280, a product of Japan Reichhold Company) was used, and as the polyether, polytetramethylene glycol of a molecular weight of about 2000 (tradename PTG 500, a

EXAMPLE 2

The experiment was carried out with the equivalent relationship as in Example 1 excepting that polyethylene glycol adipate glycol of an average molecular weight of 980 was used instead of the polyester glycol (ODX-280) used in Example 1 to obtain a laminated safety glass.

EXAMPLE 3

As in Example 2, a laminated safety glass was obtained using polyethylene glycol adipate of an average molecular weight of 1400.

EXAMPLE 4

A transparent laminated safety glass was obtained by operating as in Example 1, except that instead of the polyester glycol (ODX-280) used therein one which is also a polyester glycol but formed from a mixture of a predominant portion of the ethylene glycol and a minor portion of propylene glycol, and adipic acid and having a molecular weight of about 2000 (tradename ODX-105, a product of Japan Reichhold Company) was used.

EXAMPLE 5

A laminated safety glass was obtained as in Example 1 except that instead of the polyester glycol (ODX-280) used therein one which is also a polyester glycol but formed from a mixture of a predominant portion of ethylene glycol and a minor portion of propylene glycol, and adipic acid and having a molecular weight of 2000 was used.

EXAMPLE 6

Example 1 was repeated except that instead of 10.2 grams of MOCA 6.8 grams of MOCA to which had been added 1 grams of 1,4-butane diol were used to obtain a laminated safety glass.

COMPARISON 1

Except that polyether glycol (polytetramethylene oxide glycol) of a molecular weight of about 2000 (tradenames PTG 500, a product of Hodogaya Chemical Company) was used instead of the polyester glycol (ODX-280) in Example 1, the experiment was otherwise carried out as described therein to obtain a laminated safety glass.

COMPARISON 2

By way of comparison, a glass-resin laminate was made by sandwiching between two sheets of glass (same as that of Example 1) a polyvinyl butyral film of 0.76 mm thickness as the interlayer instead of a polyurethane interlayer.

The falling ball test was conducted on the laminated glasses obtained by the examples and comparisons given above, with the results shown in Table II.

Table II

| Experiment No. | Film Thickness (mm) | Results of Falling Ball Test (m) | | | |
|---|---|---|---|---|---|
| | | +40° C | +20° C | 0° C | −20° C |
| Example 1 | 0.76 | 2.5 | 2.5 | 4.0 | 3.5 |
| Example 2 | 0.76 | 2.5 | 2.5 | 4.0 | 3.5 |
| Example 3 | 0.76 | 3.0 | 3.0 | 4.0 | 3.5 |
| Example 4 | 0.76 | 3.0 | 3.0 | 5.0 | 5.0 |
| Example 5 | 0.76 | 2.5 | 2.5 | 4.0 | 3.5 |
| Example 6 | 0.76 | 2.0 | 2.0 | 3.0 | 3.5 |
| Comparison 1 | 0.76 | 2.0 | 2.0 | 3.0 | 3.0 |
| Comparison 2 | 0.76 | 2.2 | 3.5 | 3.0 | 1.2 |

Note The results of the falling ball test were obtained by dropping a 4-kg steel ball naturally from various heights onto the specimens made up of two sheets of soda-lime glass 3 × 300 × 300 mm between which the synthetic resin films of 0.76 mm thickness obtained in the several experiments were sandwiched, and were indicated by the maximum height (meter) that the ball does not penetrate the glass.

EXAMPLE 7

512 Grams of polyester glycol of a molecular weight of about 2000 (tradename ODX-105, a product of Japan Reichhold Company) were added dropwise to 94 grams of xylylene diisocyanate with stirring. After completion of the dropping, the reaction was caused to proceed at 90° C. for 1 hour and further at 100° C. for anotherhour to synthesize a prepolymers. Next, to 120 grams of the resulting prepolymer were added 37.2 grams of 1,4-butane diol and 0.41 gram of trimethylolpropane, followed by mixing the mixture homogeneously at a mixing temperature of 70° C. Foam forming in the solution was defoamed for 15 minutes at 70° C. with vacuum. After completion of the defoaming operation, the solution was injected into between two sheets of glass (the same kind as used in Example 1) and pressed for attaining a uniform thickness of the interlayer. The interlayer was then cured by heating the assembly at 130° C. for 3 hours to obtain a transparent safety glass having a polyurethane interlayer of 0.76 mm thickness. The so obtained glass was nearly perfectly colorless and transparent even after a prolonged period in a weathering test, there being practically no indication of change.

EXAMPLE 8

The experiment was carried out under exactly identical mixing conditions as in Example 4 except that a small quantity of an ultraviolet absorbent (tradename Univul D-49, a product of General Aniline and Film Corporation, U.S.A.) and an antioxidant (tradename Yoshinox SR, a product of Yoshitomi Pharmaceutical Company, Japan) were added and by operating as in Example 1 to obtain a laminar product of glass and resin. No discoloration nor change in transmittance was noted at all even after a prolonged period in a weathering test as in Example 7.

The conditions under which the weathering test was conducted were as follows:

The Weather-O-meter manufactured by Toyo Rikagaku Kogyo Company, Ltd., Japan was used in the weathering test. The weathering consisted of exposing the specimen to ultraviolet rays at a chamber temperature of 630 ± 5° C. (black panel thermometer) for the prescribed period of time while showering the specimen for a period of three minutes out of every 60 minutes.

Under the foregoing conditions, an exposure time of 200 hours is equivalent to an exposure outdoors for one year.

The polurethane film not incorporated with the stabilizers showed some change in its coloration when submitted to the weathering test for a prolonged period of time but that in which the stabilizers were incorporated did not show much change in its coloration. In Table III are shown the results of the weathering tests conducted on the laminated safety glasses obtained in Examples 7 and 8.

Table III

| Example No. | Degree of Coloration | | | | |
|---|---|---|---|---|---|
| | Exposure Time | | | | |
| | 0 Hr. | 200 Hrs. | 400 Hrs. | 600 Hrs. | 800 Hrs. |
| 7 | 20 | 20 | 20 | 22 | 20 |
| 8 | 70 | 70 | 70 | 70 | 80 |
| 1 | 50 | 100 | 150 | 200 | 250 |

Note

The degree of coloration was obtained in the following manner. Transmittance at 680, 420 and 360 mµ were measured using a spectrophotometer and the degree of coloration was calculated as follows:

$$\text{Degree of coloration} = \frac{T680\ m\mu - T420\ m\mu}{T560\ m\mu} \times 100.$$

The numerical values given in the table are values of a relative degree of coloration, and the smaller the numerical value, the less the coloration (discoloration). The superior showing of Example 7 over Example 8 is due to a difference in the cross-linking agent.

As is apparent from the results given in Table II, the laminated safety glass with the polyester type polyurethane interlayer of the present invention demonstrated results which were superior to those of the laminated safety with the polyether type polyurethane interlayer at all temperatures. On the other hand, when the invention laminated safety glass is compared with the glass with the polyvinyl butyral interlayer, it is obvious that the invention safety glass is superior to that with the polyvinyl butyral interlayer especially at the lower temperatures. Further as regards the adhesiveness of the glass and the resin, the falling ball test results show that the adhesion between the broken pieces of glass and the film was good such as to cause no scattering of the glass.

Again, as to the weatherability required as a safety glass, there was practically no change, as shown in Table III, when the safety glass of the invention was submitted to weather resistance test for a prolonged period of time using the Weather-O-Meter.

Thus, since as hereinbefore described the invention laminated safety glass is one in which a polyurethane prepolymer is cured between at least two sheets of glass, it can be manufactured by a simple method consisting of injecting the liquid polyurethane prepolymer into between the glass sheets and then curing the prepolymer. Hence, it has the advantage that there is no need for such complicated manufacturing steps as is required in the case of the polyvinyl butyral resin.

Further, since the invention laminated safety glass uses as its interlayer a polyester type polyurethane obtained by adding a curing agent to the reaction product of a diisocyanate compound and a polyester prepared by reacting a dicarboxylic acid or its acid anhydride with a glycol and having the OH group at its ends, it excels in its tear resistance and falling ball test values, as indicated in Table I and II, and hence possesses the desirable and excellent properties that are required of a safety glass.

We claim:

1. A transparent laminated safety glass comprising a laminated assembly of two sheets of glass between which is sandwiched an interlayer of a polyurethane elastomer which bonds together said glass sheets, said interlayer having a thickness of between 0.2 and 5mm. and consisting essentially of a polymeric elastomeric polyurethane that is obtained by curing (a) an isocyanate terminated prepolymer, which is the reaction product of poly(ethylene propylene adipate) glycol having -OH groups at both ends and a molecular weight of about 2000 and toluene diisocyanate with (b) 4,4'-methylene-bis(2-chloroaniline) curing agent, the mole ratio of prepolymer to curing agent being from 4:3.

2. The laminated safety glass of claim 1 wherein the prepolymer is cured by the combined use of 1,4-butane diol and 4,4'-methylene-bis(2-chloroaniline).

3. The laminated safety glass of claim 1 wherein at least one compound selected from the group consisting of ultraviolet light absorbents and antioxidants is incorporated with said polyurethane elastomeric interlayer.

4. The laminated safety glass of claim 1 wherein the prepolymer is formed from between 1 and 2.5 moles of toluene diisocyanate per mole of poly(ethylene propylene adipate) glycol.

5. The laminated safety glass of claim 1 wherein the prepolymer is cured by the combined use of 4,4'-methylene-bis(2-chloroaniline) and trimethylol propane, or 4,4'-methylene-bis(2-chloroaniline), trimethylol propane and 1,4-butane diol.

* * * * *